United States Patent Office 2,909,193
Patented Oct. 20, 1959

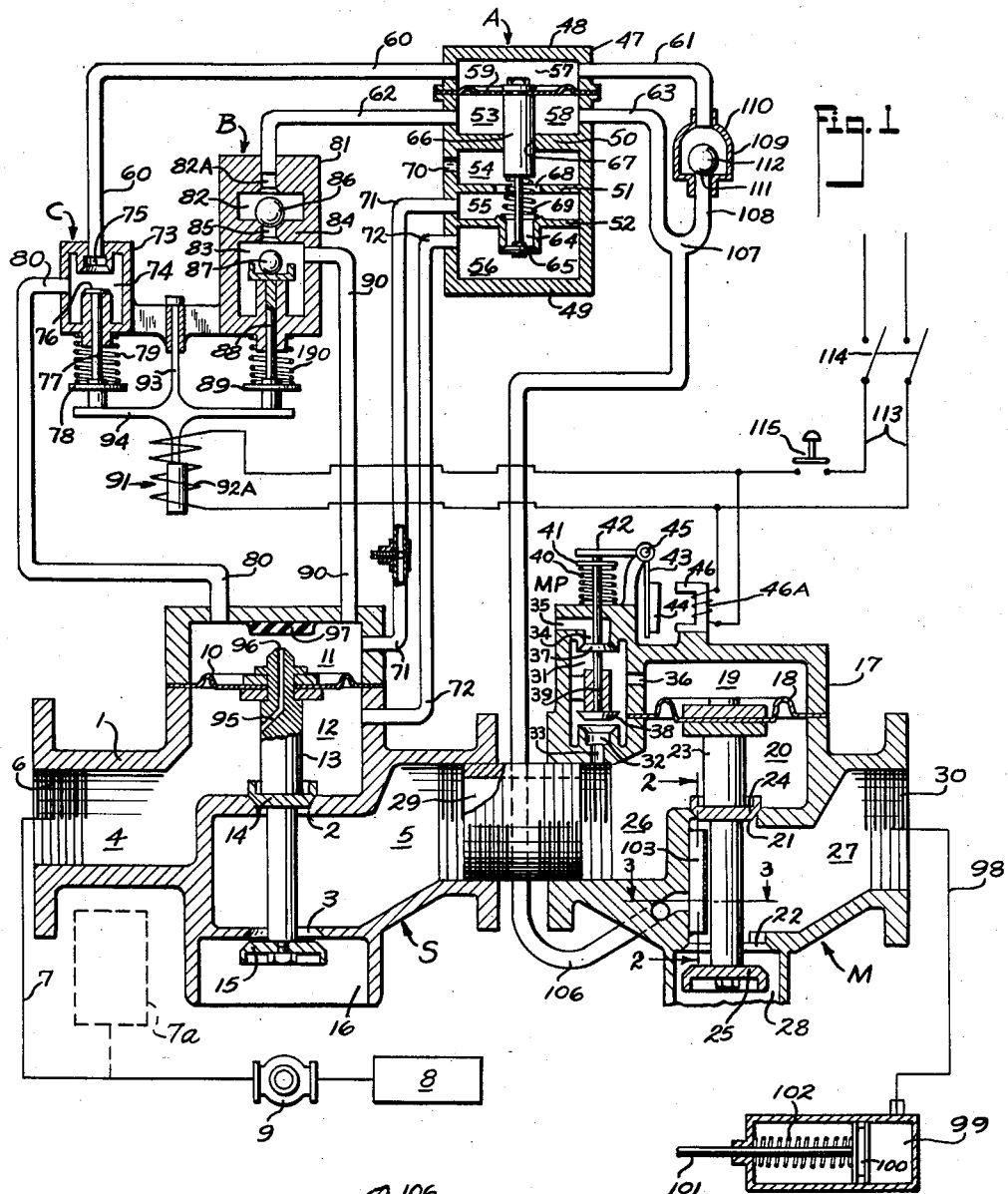

2,909,193

VALVES AND SAFETY CONTROLS THEREFOR

Robert H. Hoge, Gates Mills, Ohio, assignor to The Clark Controller Company, Cleveland, Ohio, a corporation of Ohio Application February 23, 1955, Serial No. 490,080

14 Claims. (Cl. 137—620)

This invention relates to valve apparatus of the class in which valves are operated to supply fluid under pressure from a source to an apparatus to be served or operated; and are restored to cut off or exhaust the supply of pressure; and in which the valves thus operate and restore in response to control signals transmitted thereto.

In the various arts, the apparatus to be pressure-served by valve apparatus of this class is often of such nature that the valve apparatus when signalled, to operate or to restore as referred to, must do so infallibly, and therefore safely, because otherwise damage to the pressure-served apparatus or injury to personnel attending it may result.

An illustrative example of such a pressure-served apparatus is a cyclically operating motor driven machine having a clutch and brake, operated to engage the clutch and release the brake to start the machine, and to release the clutch and set the brake to stop it, by reciprocations of a piston in a cylinder, when pressure is respectively applied to and exhausted from the cylinder; and an air valve device is operated and restored, respectively, to communicate air pressure to and exhaust it from the cylinder, in response to signals to the device from a manual or machine operated control.

In such an example it is particularly important that the valve device shall exhaust the cylinder to stop the machine when signalled to do so, to be safe as referred to.

Controls for the valve devices of such machines for the purposes mentioned have been developed to a high degree of safety, illustrative of which is the power press control described in the Patent No. 2,133,161 and valve devices per se comprising valves operable to admit air pressure to and exhaust it from a cylinder adaptable to such machines have been developed that operate responsive to control signals with a high degree of infallibility, illustrative of such valve devices being that described in the copending patent application of Jan R. Ohlsson, Serial Number 417,795, filed March 22, 1954, (assigned to the instant assignee).

It is known however that such valve devices, no matter how infallible they may be in responding to actuating signals when first made and installed, are, in use, subject to deterioration from wear and tear, mechanical fatigue of materials, infrequent or careless inspection and maintenance, etc. and after a period of use the reliability and safety features carefully built into them are no longer sufficient to prevent faulty operation or failure of signal response, and they cease to be completely safe in the respects above noted.

An object of the invention is to provide a valve apparatus adaptable for use with control systems that have been developed to a high degree of safety in operation as referred to, and which valve apparatus will have as high a degree of infallibility and safety as the control systems.

Another object is to provide a valve apparatus for supplying pressure to a served apparatus and for cutting off or exhausting the pressure from the apparatus, which when signalled so to do by a control, will do so with a degree of reliability and infallibility nearer to absolute infallibility than has heretofore been possible.

The invention is applicable to various uses in the several arts. Since its use to serve the clutch and brake air cylinder of a cyclically operating machine as referred to, is one of its more important uses, and in order to describe herein concretely at least one of its uses, as required by law, it has been chosen to describe it herein as supplying air under pressure to an air cylinder and piston servo device, and exhausting it therefrom.

The invention may be embodied in various forms, but in the form described herein it comprises, in general, two valve devices adapted to be connected in series between a supply source of air pressure and the said air cylinder. The valve devices each comprise valve ports; and respective valves reciprocable to two positions; which may be referred to as effecting an "on" condition and an "exhaust" condition of the devices. With both devices in the on-condition, air flows from the source through both valve devices in series to the air cylinder. If either device goes from the on-condition to the exhaust-condition, it exhausts air from the cylinder.

Normally, a first one of the valve devices is always maintained in the on-condition; and the second one is operated alternately to on- and exhaust-condition to supply pressure to and exhaust it from the air cylinder when signalled to do so by a control, preferably electromagnetic.

If because of the development of a fault or failure to perform its function the said second valve device fails to go to exhaust condition when signalled so to do, the first device is automatically caused to go to exhaust-condition and exhaust the cylinder; and is thereafter maintained in exhaust-condition until the second device is replaced or repaired to correct the fault or failure.

The valves of both devices are reciprocable as referred to by diaphragms connected to them and by the difference of effective air pressures communicated to opposite sides of the diaphragms.

To move the first valve device to, and normally hold it continuously in on-condition as referred to, pressure from the source is communicated to one side of its diaphragm, and pressure is exhausted from the other side; and when, in the event of any fault or failure, the second valve device fails to go to exhaust-condition, pressure is automatically communicated to the said other side of the diaphragm of the first device in a manner to cause it to move the valve device to and hold it in exhaust-condition.

The means by which the first valve device is held normally in on-condition and is caused to go to exhaust-condition upon failure of the second valve device to do so on signal, comprises operating parts which perform functions that insure certain and stable functioning of the first device, thus multiplying the safety provided for by the first device; and in the event that said operating parts should fail to perform their functions, means is provided by which the first valve device is rendered responsive to such failure and goes to exhaust-condition.

Another object of the invention is to provide a valve apparatus having the features and characteristics of operation set forth in the foregoing general description.

From the foregoing, it will be seen that the said first valve device, by being maintained always in on-condition during normal on and exhaust operations of the second valve device, is not subjected to wear and tear and deterioration, so that when called upon to go to exhaust-condition will be in effect a fresh new valve device and will therefore safely perform.

It is therefore another object of the invention to provide generally a valve apparatus having two valve devices in series between a source of pressure and an apparatus to be served, a first one of which is normally maintained in an air flow or on-condition and the second of which is alternately operable to an on-condition to supply air pressure to a served apparatus and to an exhaust condition to exhaust the apparatus in response to signals communicated thereto; both valve devices being operable to go to on-condition or to exhaust-condition by a difference of air pressure applied thereto, and the first device automatically going to exhaust-condition upon failure of the second one to do so in response to signal.

An embodiment of the invention is fully disclosed in the following description taken in connection with the accompanying drawing, in which:

Fig. 1 is a view, partly diagrammatic, illustrating an embodiment of the invention; and Figs. 2 and 3 are sectional views taken from the planes 2—2 and 3—3 of Fig. 1 with parts behind the section planes omitted for simplicity.

Referring to the drawing, Fig. 1, there is shown generally at M a main valve device and at S a safety valve device.

The valve device S comprises a housing 1 preferably of cast metal, formed with circular interior valve ports 2 and 3 axially aligned, one above the other as viewed, an air inlet 4, and an outlet 5. Threads 6 adapt the inlet to be connected by a conduit to a supply of air under pressure; and to simplify the drawing the conduit is indicated diagrammatically at 7 going to an air supply pressure source 8 through a valve 9 which may be manually operated to open or close the conduit 7 to cut off air from or admit air to the inlet.

Within the housing 1 and above the valve ports 2 and 3 is a diaphragm 10 dividing the upper part of the housing into two chambers 11 and 12; and the diaphragm is connected to a valve stem 13 carrying disc valves 14 and 15 spaced axially so that when the valve stem 13 is moved upwardly as viewed the valve 15 will close the port 3 and the valve 14 will open the port 2, and vice versa, as to the ports, when the valve stem is moved downwardly. The stem is shown in the downward position.

The valve stem 13 is moved upwardly and downwardly by unequally effective pressures in the chambers 11 and 12 acting on the diaphragm 10 and the pressure acting down on the top of disc valve 14 when in the exhaust-condition or the pressure acting down on the top of disc valve 15 when in the on-condition, to flex diaphragm 10 in one direction or the other; to be described.

When the valve stem 13 is moved upwardly, air entering at the inlet 4 flows through port 2 to the outlet 5.

When the valve stem is moved downward, to the position shown, inlet air is cut off and the outlet 5 is connected to an exhaust opening 16 through the port 3.

The valve device is shown in its unoperated or "exhaust-condition" as defined in the foregoing.

The valve device M is similar to the valve device S as just described and comprises a housing 17; a diaphragm 18 and two chambers 19 and 20; valve ports 21 and 22; a valve stem 23 and two disc valves 24 and 25; an air inlet 26 and outlet 27; and an exhaust opening 28; and is shown in the unoperated "exhaust-condition."

The inlet 26 of valve device M is connected to the outlet 5 of valve device S by a tubular passageway 29; and the outlet 27 of valve device M is adapted by threads 30, to be conduit-connected to apparatus to be operated by air pressure.

Associated with the valve device M is a pilot valve device indicated generally at MP comprising an air chamber 31 communicating through a valve port 32 and a duct 33 with the inlet 26; and communicating through a valve port 34 and a duct 35 with the atmosphere; and communicating through a duct 36 with the aforesaid diaphragm chamber 19.

Disc form valves 37 and 38 on a vertically reciprocable stem 39, cooperate with the ports 34 and 32; and when the stem is reciprocated upwardly, the exhaust duct 35 is closed and the duct 33 opened, and vice versa to open the exhaust duct 35 and close the duct 33 when reciprocated downwardly.

The stem 39 is normally held in its upper position as illustrated by a spring 40 reacting between the housing and a head 41 on the stem.

A bell crank having an arm 42 engaging the stem end, and a depending arm 43 carrying a magnet armature 44, is pivotally supported at 45 on the housing and rocked counterclockwise to move the stem downwardly in opposition to the spring when the winding 46A of a magnet 46 mounted on the housing is energized.

At A generally is illustrated a valve device comprising an elongated closed housing 47 having transverse end walls 48 and 49, and intermediate walls 50, 51 and 52, which divide the housing into compartments 53, 54, 55 and 56.

The uppermost compartment 53 is divided into an upper and lower pressure chamber 57 and 58 by a flexible diaphragm 59. The upper chamber 57 communicates with two air conduits 60 and 61; and the lower chamber 58 communicates with two air conduits 62 and 63.

In the lowermost compartment 56, a valve port 64 is formed in the transverse wall 52, and a disc form valve 65 in the compartment 56 and below the port, is connected to the diaphragm 59 by a stem 66, of small diameter at its lower part and passing through the port and through apertures 67 and 68 in the transverse walls 50 and 51.

The upper part of the stem 66 is of enlarged diameter and, slidingly fits the aperture 67 and when it moves downwardly in an operation to be described it enters the aperture 68 substantially closing it.

A spring 69 extending through the aperture 68 reacts between the upper part of the stem and the transverse wall 52 and normally holds the valve 65 in port closing position as illustrated.

The compartment 54 exhausts to atmosphere through an outlet 70.

The compartments 55 and 56 respectively communicate with conduits 71 and 72, which respectively go to the upper and lower chambers 11 and 12 of the safety device S.

Indicated generally at C is a valve device comprising a housing 73 closed to form a walled compartment 74, which communicates through a valve port 75 at its upper portion, as viewed, with the said conduit 60. Oppositely below the port is a disc form valve 76 on a vertically reciprocable valve stem 77 projecting from the housing and exteriorly having a head 78 thereon. A spring 79 reacts between the head 78 and the housing to normally hold the valve 76 down to keep the port 75 open. The compartment 74 communicates laterally with a conduit 80, going to the aforesaid upper chamber 11 of the safety valve device S.

Indicated generally at B is a valve device comprising a closed housing 81 divided into upper and lower compartments 82 and 83 by a transverse wall 84. The upper compartment 82 communicates with the aforesaid conduit 62. The transverse wall 84 has a port 85 therethrough and a ball check valve 86 in the compartment 82 normally rests on the upper side of the port 85 by gravity and closes it, and may move to the upper side of the compartment 82 to close a port 82A to block the conduit 62. Below the port 85 another ball valve 87 is loosely supported upon the upper end of a vertically reciprocable valve stem 88, and upon upward reciprocation of the stem is moved therewith to close the port 85.

The valve stem 88 projects downwardly out of the housing and has a head 89 thereon, and a spring 190 reacts between the head and housing to normally hold the stem 88 down to support the ball 87 in port open position.

The lower compartment 83 communicates by a conduit 90 with the aforesaid upper chamber 11 of the safety device S.

Below the devices C and B is an electromagnet 91, (the one shown being of the solenoid-plunger type) which when it is energized raises its plunger 92 and both valve stems 77 and 88 against the force of the springs. To this end the solenoid plunger 92 is guided for vertical movement by a stem 93 in a bracket of the housings 73 and 81, and is energized by a winding 92A.

A bar 94 is connected at its middle to the stem 93 and has opposite ends overlapping and engaging the lower ends of the stems 77 and 88. The stems move in unison with the plunger.

Referring again to the safety valve device S, there is a communication between the upper and lower chambers, 11 and 12, by way of a small diameter duct 95 in the stem 13, opening laterally into the chamber 12, below the diaphragm 10, and passing upwardly axially through the stem, and, above the upper side of the diaphragm, opening into the chamber 11 at an orifice 96 on the end of the stem.

Immediately above the orifice 96 is a rubber or like yieldable pad 97 on the chamber wall. When in operation to be described, the valve stem 13 rises and closes the lower port 3, and opens the upper port 2, the orifice 96 on the end of the stem is concurrently closed and sealed upon the rubber pad 97. The pad 97 and orifice 96 thus constitute a valve and valve port.

Referring again to the main valve device M, and as mentioned hereinbefore, the outlet 27 is to be conduit-connected to an air cylinder to supply air pressure thereto, and from which the pressure may exhaust at the exhaust opening 28, as the valves, 24 and 25, are moved upwardly or downwardly respectively, that is as the device M goes from on-condition to exhaust-condition. To simplify the drawing, a condit 98 is shown, diagrammatically, going from the outlet 27 to an apparatus cylinder 99 at a point behind a piston 100 therein, to propel a piston rod 101 forwardly against the force of a spring 102, to perform a work stroke when air under pressure flows from the outlet 27 and is applied to the conduit 98. When the valves 24 and 25 move down to the illustrated position, the application of pressure to the conduit 98 is cut off, and the spring 102 returns the piston 100, and the air is exhausted out of the cylinder 99 through conduit 98 and exhaust opening 28, and the piston rod 101 is thereby given a return stroke. The piston rod 101 may be used to operate a clutch and brake as described in said Patent No. 2,133,161.

Within the valve device M to the left of the valve stem 23 (as viewed in Fig. 1) and between the valve ports 21—22 is a downwardly converging walled passageway 103 open at the top and bottom, generally of rectangular cross section. It may be provided by casting its walls integrally with the housing 1, as indicated in the drawing; or it may be made separately and rigidly mounted in place.

When the valve stem 23 and valves 24 and 25 are in the illustrated position, and exhaust air flows as described in at the outlet 27 and out at the exhaust opening 28, it flows over the outer wall of the passageway 103 and downwardly over its lower end and on generally the Venturi principle, creates a reduced pressure or partial vacuum within the passageway; and after exhaust is complete and the flow stops, the interior of the device M between its ports will be at atmospheric pressure as will also the passageway 103.

When the valve stem and valves 24—25 are in their upper positions, the interior of the device and the passageway 103 are subjected to source air pressure as will be apparent.

A conduit 106 communicates with the interior of the passageway 103, and is subjected to the pressure therein, and goes upwardly in the drawing, to a point 107 where it forks, one branch becoming the aforesaid conduit 63 and the other branch 108 going through a ball check valve 109 and thence to the conduit 61.

The check valve 109 comprises a closed housing 110 having a valve port 111 communicating with the conduit branch 108 and a ball check valve 112 normally closing the port by gravity.

From the foregoing it will appear that the conduit 106 may have positive source pressure therein and communicate it to both chambers 57 and 58 of the valve device A, or may have atmospheric pressure or partial vacuum therein and communicate it to the chamber 58 tending to reduce pressure in the chamber or to let it exhaust, but not communicating it to the chamber 57 to reduce pressure therein because of the check valve 109.

The magnet windings 92A and 46A are, as shown, connected in parallel to current supply mains 113, through a main switch 114.

With the switch 114 closed, a normally open operator's contactor 115 in series with both windings 92A and 46A energizes them simultaneously, when it is closed, and de-energizes them simultaneously when opened, as the circuit in the drawing plainly shows.

Assuming that the air valve 9 is turned off and that that the operator's contactor 115 is open, the parts take up the out of use positions illustrated and described above.

Upon opening the valve 9, the parts go to normal or workable positions as follows.

Air under pressure from the source 8 flows through conduit 7 into inlet 4 and to the chamber 12 and is applied on the lower side of the diaphragm 10 exerting thrust to flex it upwardly. The whole area of the diaphragm is not subjected to pressure, being reduced by the sectional area of the stem 13. Also downward pressure on the valve 14 opposes the upward pressure. There is however a resultant upward thrust. It may be interjected here that any pressure in the upper chamber 11 will act downwardly and be effective on the entire area of the diaphragm 10 whereas, as just described this is not true of pressure in the lower chamber 12. It is therefore apparent that for a given pressure in the chamber 11 it would take a higher pressure in the chamber 12 to overcome it and raise the diaphragm. In an actual structure for example that of the said Ohlsson patent application of which the valve device S may be considered as a diagrammatic representation, the ratio of such pressures may be of the order of 100 in the chamber 12, to 30 in the chamber 11. Similarly, in order to flex the diaphragm downwardly the ratio of pressures may be of the order of a little more than 30 in the chamber 11 and 100 in the chamber 12. The area of disc valves 14 and 15, may be changed relative to the area presented by diaphragm 10 to the pressure is chamber 12 and thereby effect a change in the afore-described ratio of pressures.

Air pressure is communicated from chamber 12 to chamber 11 through the duct 95 in the valve stem, but the chamber 11 exhausts by way of conduit 71, chamber 55 of the valve device A, orifice 68, compartment 54 and exhaust outlet 70. Pressure can also exhaust from chamber 11 by way of conduit 90, compartment 83 of device B, through port 85 raising check ball 86 and thence by conduit 62, chamber 53, conduit 63, conduit 106 into the housing of the valve device M and thence out at exhaust opening 28.

The combined exhaust at conduits 90 and 71 is made free enough so that pressure cannot accumulate in the chamber 11 from the orifice 96, sufficiently to exert any substantial downward thrust on the diaphragm, and the said resultant upward thrust on the diaphragm flexes it upwardly and raises the valve stem 13 and its valves 14—15 and closes the port 3 and opens the port 2. This movement of the stem also closes and seals the orifice 96 on the pad 97, thus cutting off the supply of all pressure to the chamber 11; while fully exhausting it at the conduits 90—71; and the safety valve device S may now be referred to as locked in its operated or on-condition, alerted to perform its safety functions as will be described.

The said free exhaust from chamber 11 keeps the pressure in chamber 11 so low that the said ratio of pressure in the two chambers is so far below the 30 to 100 ratio referred to, that the resultant upward thrust on the diaphragm is enough to raise it and the valves 14—15 substantially instantaneously when the valve 9 is turned on without the disadvantages and uncertainty of sluggish delayed action; and this is true even when there is some delay in the building up of pressure in the chamber 12 after the valve 9 is turned on which in some cases results from the use of a pressure reservoir or accumulator tank in the line 7 from the source as indicated in broken line at 7A.

Upon locking the device in its on-condition as just described, air at the pressure of the source flows through the port 2, outlet 5, passage 29 to inlet 26 and chamber 20 of valve device M.

The device M is in unoperated or exhaust-condition with valves 24 and 25 down.

The lower side of diaphragm 18 and the area of the upper side of valve 24 are subjected to line pressure from the valve device S, in the chamber 20, and opposite forces are produced on the diaphragm 18, with a resultant upward thrust on the diaphragm 18 tending to raise the stem 23 and valves 24—25.

At the same time, source pressure is applied through the duct 33 and valve port 32 and duct 36 to the chamber 19 and exerts downward thrust on the upper side of the diaphragm 18; and this downward thrust predominates over the said resultant upward thrust in a ratio of the order of 100 to 30 as described, and the valve stem 23 and valves 24—25 are held down.

The valve apparatus is now in normal or workable condition with device S in on-condition and device M in exhaust-condition.

Obviously, the cylinder 99 of the apparatus to be served is at this time exhausted through valve port 22 as described and the piston rod 101 is retracted, in the normal condition of the parts.

Normal operation

In general, in normal operation, when contactor 115 is closed by the operator, the safety valve device S remains locked in on-condition as described, and undisturbed, and the main valve device M is operated to on-condition and supplies pressure to the cylinder 99; and when the contactor 115 is opened, the safety device S remains locked and undisturbed, and the valve device M restores and goes to exhaust-condition and exhausts pressure from the cylinder 99; and this is caused to occur as follows.

Closing of the contactor 115 energizes magnet 46 which acting through the bell crank 43—42 pushes valve stem 39 down, closing port 32 by valve 38, and opening port 34 by valve 37. Closing of contactor 115 likewise energizes coil 92 which causes plunger 92 to raise. This move bar 94 so that stems 77 and 88 are raised and respectively they cause valve 76 to close port 75 and ball 87 to close port 85.

Valve 38 cuts off pressure to the upper chamber 19 through duct 36 and exhausts the chamber 19 through duct 36 and outlet 35 by valve 37.

Pressure in the chamber 20 now raises the valve stem 23 and the valves 24 and 25, to open port 21 and close port 22 as described and pressure flows as described from the inlet 26 to conduit 98 and to the cylinder 99; and this continues so long as the contactor 115 is maintained closed.

When contactor 115 is opened, de-energizing magnet 46, the spring 40 moves valve 37 to close port 34, and moves valve 38 to open port 32. This as will be apparent gives pressure to both chambers, 19—20, but that in chamber 19 being more effective on the diaphragm 18 by a ratio of say 100 to 30 as referred to hereinbefore, the diaphragm moves down and restores the device M to exhaust-condition, exhausting cylinder 99 as described.

During such normal operation, the device A remains inactive. When the device M goes to on-condition, the conduit 106 is subjected to the full pressure as described; and by branch conduits 61 and 63, this pressure is communicated to both chambers 57 and 58 of the device A, and thence to conduits 60 and 62 respectively. The pressure in conduit 60 is trapped therein at the port 75 of device C, because at this time the magnet 91 is energized and holds port 75 closed by valve 76.

The pressure in conduit 62 is trapped by the check valve 86.

With equal pressures in the chambers 57 and 58 device A will remain inactive as described.

When the device M goes to exhaust-condition, the conduit 106 is subject to exhaust pressure or partial vacuum, and this is communicated by conduit 63 to chamber 58 of device A but not to chamber 57 because of check valves 109; and the pressure in chamber 58 apparently would be less than that in chamber 57. However, due to de-energization of magnet 91, at this time, valve port 75 is open and any pressure in chamber 57, discharges to atmospheric pressure by the path of conduit 60, port 75, conduit 80, chamber 11, conduit 71, aperture 68, and outlet 70; and device A accordingly remains inactive.

The said exhaust through chamber 11 as part of the exhaust path is free enough not to develop pressure in chamber 11.

The device A becomes active in connection with the development of an unsafe fault or failure of function in the apparatus, and automatic safety protection results therefrom as will be described.

Provisions insuring safe operation

For purposes of setting forth a concrete use of the present invention, it has been referred as operable to supply air pressure to and exhaust it from a piston and cylinder device 99—102. Also, the Patent No. 2,133,161 has been cited as exemplifying the use of a piston and cylinder device in circumstances in which infallible exhausting of the cylinder is essential for safe operation of the machine.

The full improvements and advantages of the present invention therefore, particularly as to the aforesaid safety, may be expressed in connection with the piston and cylinder device 99—102, by considering that the highest possible degree of safety would be attained if the cylinder 99 infallibly exhausted when signalled to do so.

The following describes the possible faults that may develop in the apparatus, above described, and the possible failures of function thereof, and how they are automatically prevented from causing an unsafe operation of the served apparatus, by preventing the supply of operating pressure to the cylinder 99 in the first instance, or causing the cylinder to exhaust in spite of such faults and failures, and to remain exhausted until the fault or failure is remedied.

Fig. 1 represents diagrammatically an apparatus which in actual practice is assembled in a compact unit, ready to be installed for the described uses, by screwing aligned conduits into the threaded inlet 6 and outlet 30. The unit thus mounted in or upon the conduit line, must be right side up to dispose the movable parts in their intended positions to insure free intended movements thereof. Workmen often do not observe this requirement and may mount the unit upside down, or nearly so. In the event of such faulty mounting, the ball valve 87 in the device B will roll into the port 85 and close it and block the conduit 90.

As was described, the valve device S must first be put in on-condition, to prepare the apparatus for use, and this requires as described that there must be free exhaust from the chamber 11 by the conduits 90—71 jointly. Blocking the conduit 90 therefore will prevent putting the valve device S in on-condition and the apparatus cannot be operated until the faulty mounting has been corrected, thus insuring that it will not operate abnormally on account of faulty mounting.

Again, to realize the full safety benefits resulting from having the valve device S locked in on-condition at the start before the apparatus is otherwise operated, for example before any signal is given by the contactor 115, provisions are present which prevent operating the device S to on-condition when pressure is turned on at the valve 9, if the contactor 115 is prematurely closed at the time.

Closing the contactor 115 energizes magnet 91 raising the ball 87 and moving it to close the port 85. This blocks the exhaust conduit 90. Blocking exhaust conduit 90 has already been described as preventing operation of valve device S to the safety locked out on-condition in connection with faulty mounting of the apparatus upside down, and now again blocking exhaust 90 by faulty operation of the contactor 115, performs this same safety action.

Again, the valve device M is normally in exhaust condition, valves 24—25 down, and to signal it to go to on-condition, the contactor 115 is closed. If due to any fault or failure of function of the magnet 46 or valve device MP, or of the diaphragm 18, valves 24—25 etc., the valve device M does not respond to signal, but remains in exhaust condition, the cylinder 99 will remain exhausted, safety will be inherent in the failure, and no other provision for safety is needed.

Again, the valve device M may have responded to signal upon closing contactor 115 and may have operated to on-condition; moving the valves 24—25 up and transmitting pressure to the cylinder 99; but upon opening the contactor 115 the valve device M due to some fault or failure of function, may not restore to exhaust condition to exhaust the cylinder 99.

In view of the premises, this failure will be recognized as the most dangerous of all possible failures of function.

In such a case however, the valve device S will restore to exhaust-condition so that the cylinder 99 will exhaust back through the port 21 of the valve device M and port 3 of the valve device S and out at the exhaust outlet 16; the aforesaid safety function of the valve device S thus being performed; and this is effected as follows.

The valve device S is being held locked in on-condition by pressure below the diaphragm 10 as described. In general, pressure is now applied in the chamber 11 above the diaphragm to break the lock and move the diaphragm down. This pressure comes from the valve device M by way of conduit 106, the interior space of the device M and the passageway 103 between the valves being under source pressure at this time and conduit 106 being subjected to this pressure as heretofore described.

The path of the pressure is: conduit 106, check valve 109, conduit 61, chamber 57 of device A, conduit 60, open port 75 of device C, conduit 80 to chamber 11. Port 75 of device C as implied here is open at this time since magnet 91 was de-energized when the contactor 115 opened to signal exhaust at device M.

This discharge of pressure into the chamber 11 cannot exhaust by way of conduit 90 because of ball check valve 86 in device B which is held down on its seat by pressure concurrently coming from conduit 106; conduit 63, chamber 58 of device A and conduit 62.

Exhaust from chamber 11 can occur by conduit 71, aperture 68 of device A, and outlet 70.

The exhaust through conduit 71 however is made more restricted than the pressure supply from conduit 80 and pressure accordingly accumulates in the chamber 11 above the diaphragm 10; and (in view of the aforesaid ratio 30 to 100) soon overcomes the pressure below the diaphragm and moves it downward enough to break the seal of the duct orifice 96 on the cushion pad 97. Immediately, line pressure in chamber 12 flows through the duct 95 to chamber 11 and augments the pressure from conduit 80, and the diaphragm 10 and the valves 14–15 are moved down with positive instantaneous movement putting the valve device S in exhaust condition as referred to.

It will be noted here that the safety device S is caused to exhaust the cylinder 99 by utilizing the very pressure that is being communicated to the cylinder 99 by failure of the valve device M.

In the operation just described the pressure in the conduit 106 is communicated to chamber 57 of device A tending to move its diaphragm down. When the device S exhausts as described, device M is still in on-condition and its interior between the ports 21–22 and in the passageway 103 and therefore in conduit 106 falls to atmospheric pressure as described hereinbefore and this is communicated by conduit 106 to chamber 58 of device A. It is not communicated to chamber 57 because of the check valve 109.

The pressure in chamber 57 therefore predominates, the diaphragm 59 moves the stem down, the stem 66 enters the aperture 68 and isolates outlet 70 cutting off exhaust of chamber 11 by conduit 71, and also opens the port 64.

By providing some clearance between the stem and the aperture wall, exhaust may continue through the exhaust outlet 70 at a negligibly low rate, and will be audible as a signal indicating that said operation of device A has occurred.

This operation of device A connects conduits 71–72 by way of open port 64, whereby both chambers 11 and 12 are subjected to equal pressure, namely supply pressure in chamber 12 going by conduit 72, port 64 and conduit 71 to chamber 11. This pressure in chamber 11 is more effective on the diaphragm 10 than the same pressure in chamber 12 which also acts downward on the top of disc valve 14, and the resultant pressure is in the direction to hold the device S in exhaust condition.

Device A is maintained operated, chamber 57 being subject to source pressure from chamber 11 by conduits 80 and 60, and chamber 58 being exhausted to atmospheric pressure by conduits 63 and 106.

The aforesaid failure of the valve device M to go to exhaust-condition as referred to when the contactor 115 opens, may be a fault or failure of function in the magnet 46 or in the pilot valve MP or in the diaphragm 18 or in the movable system of valves 24—25 and stem 23; etc. but whatever the fault or failure, exhaust of the cylinder 99 will safely occur at the valve device S as has just been described.

Reference has been made in the foregoing to the rate of exhaust from chamber 11 of the device S, by the conduits 90—71 jointly as being greater than the rate of input of pressure at the orifice 96; and to the rate of input of pressure at the conduit 80 as being greater than the rate of exhaust by the conduits 90—71.

These relations can be readily established by making the orifice 96 of a suitable relatively small size, and the conduit inlet 80 of larger size and the conduits 71—90 jointly of an intermediate size. These relative sizes are not critical, but if desired may be readily adjusted one to the other by adjusting the effective intermediate size of the conduits 71—90 by adjusting the size of one of them, say the conduit 71, by a valve as shown at 116 in the drawing.

Again, when the contactor 115 is opened signalling the device M to go to exhaust-condition, device M may do so, but not completely; for example a metal chip may have become lodged between the valve 24 and its seat 21; or the valve and stem for some other reason may stick with the valve 24 partly open. The port 22 in such case will be nearly wide open, or far enough open for exhaust to occur safely; but with such a fault present it is not safe to continue to use the valve apparatus and by the following means the valve device S is caused to go to and stay in exhaust-condition until the fault is corrected.

The conduit 106 may tend to exhaust through passage 103 and exhaust outlet 28; but air under pressure at the port 21 of device M and escaping under the partly open valve 24, enters the upper end of the downwardly converging passageway 103 and subjects the interior thereof to pressure and communicates pressure to the conduit 106.

The contactor 115 upon signalling the device M to go to exhaust-condition also de-energized magnet 91 of device C so that at this time port 75 is open.

It has already been described how pressure in conduit 106, and with valve port 75 of device C open, making pressure communication to conduit 80 and thence to chamber 11 of device S, will cause device S to go to exhaust-condition. These same circumstances are now present with the same results as before and as a consequence valve device S goes to exhaust-condition.

Again, whenever contactor 115 is closed and opened respectively to signal normal operation of valve device M to on-condition and exhaust-condition respectively, magnet 91 is also energized and de-energized respectively; and the devices C and B must thereupon operate normally and restore normally, for safe operation.

In an instance when contactor 115 closes and device M goes to on-condition, magnet 91 simultaneously energized may for some reason fail to cause valve 76 to close port 75. Thus device M will be in on-condition, conduit 106 will be subjected to pressure as described, and port 75 will be open, which are the same circumstances as described above, when port 75 comes open upon failure of device M to go to exhaust-condition. The result now will be the same as before, namely, device S will go to safe exhaust-condition but this time for the reason that device C failed to operate normally when the magnet 91 was energized.

In this instance when contactor 115 closed, if device B also should fail to operate normally and fails to raise the ball valve 87 to close the port 85, no danger would be involved and no safety function called for since there is no flow at the time in conduit line 90—62 due to ball 86 being held to close the port 85.

In an instance when contactor 115 opens, the valve device M may go safely to exhaust-condition, but for some reason when magnet 91 is simultaneously de-energized, valve 76 may not open port 75 and ball 87 may not descend. This failure is not of itself dangerous because exhaust has already been effected at device M, but it would be unsafe to continue to operate the apparatus with the cause of this failure still present, and correction thereof is made necessary as follows. Exhaust in device M produces atmospheric pressure or less, in conduit 106 as described, and communicates it to conduit 63, chamber 58 of device A and conduit 62, the latter being blocked off by check ball 87 held up and closing port 85.

Also pressure in chamber 57 of device A is held trapped therein by check valve 109 at conduit 61, and by valve 76 holding port 75 closed at conduit 60.

The pressure in chamber 57 being greater than in chamber 58 and more effective on the diaphragm 59, the diaphragm moves down and, all as described hereinbefore, closes the aperture 68, moves valve 65 to open the valve port 64, and connects both chambers 11 and 12 of device S to line pressure. This causes device S to go to and stay in exhaust-condition.

Again, as has been described during successive on and exhaust operations of device M, the effective pressure in the chambers 57 and 58 of device A are balanced, depending however on the concurrent and respective closing and opening of the port 75 by the valve 76. If due to any cause the valve 76 should fail to close the port 75 concurrently as here referred to, then the device A would operate as heretofore described, resulting in moving of the valve device S to exhaust-condition.

In any of the above described instances of fault or failure of function, when the device S goes to exhaust-condition to perform its safety function, it will as described, be maintained in said condition by source pressure until correction is made by removing the fault or reason for failure. During such correction source pressure is turned off at the valve 9. When the apparatus has again been put in corrected safe functioning condition, the pressure must again be turned on at the valve 9, and this necessity insures that the device S will initially be operated to and locked in on-condition as described.

The invention is not limited to the exact or particular embodiment illustrated and described.

Changes and modifications may be made. For example, the signalling circuit for the magnet 46 of the valve device M is shown as energized and de-energized directly by an operator's contactor of the push button type; but the signalling circuit may be controlled in other ways for example as shown in the aforesaid patent.

Again, the valves of the devices S and M are shown as reciprocated by a pressure movable chamber wall in the form of a diaphragm, but a movable wall in the form of a piston in a cylinder could be utilized instead.

Again the duct 95 of the device S is shown as going through the stem 13 to communicate pressure from the chamber 12 to the chamber 11, and as being closed by a pad on the housing wall; but the duct could go from chamber 12 to chamber 11 through the stationary wall of the housing 1, and have an orifice in chamber 11 above the valve stem, and a pad on the valve stem to close the orifice, as a mechanically equivalent arrangement.

In the drawing, the parts are represented as spread apart and connected in diagrammatic form but as referred to hereinbefore they may all be assembled in a compact unit with the parts enclosed within housing walls. In the diagram certain conduits for example the conduit 106 are represented in the form of pipes. Pipes as such are not essential and their mechanical equivalent may be provided in an actual compact unit by wall-confined flow paths of any suitable form. And in the claims the term "conduit" is to be taken in this broader sense.

The invention comprehends these and all other changes and modifications which can be made by those skilled in the art without the exercise of invention, and which come within the scope of the appended claims.

I claim:

1. A valve apparatus for controlling the supply of air from an air pressure source to an apparatus to be served, and the exhaust of the air pressure from the served apparatus; the valve apparatus comprising a walled passageway having an inlet for conduit-connection to the source and an outlet spaced from the inlet for conduit-connection to the apparatus to be served; a pair of valve devices in series in the passageway each having a flow port and an exhaust port and each having a pair of valves reciprocably movable in unison to close one port and open the other; and vice versa; the flow ports being in series in walls in the passageway and the exhaust ports communicating with exhaust openings in side wall of the passageway; whereby when the flow ports are both open air may flow from the inlet through the flow ports and out at the outlet, and when either exhaust port is open and the corresponding flow port is closed the flow of air to the served apparatus is thereby cut off and air may flow back through the outlet and out at the open exhaust port; operating means to reciprocate the valves; an operable control controlling the operating means and operable to cause one pair of valves to be continuously maintained in a reciprocated position with the flow port open, while causing the other pair to repeatedly reciprocate from a position to supply air, to a position to exhaust the air; the control responding to failure of the valves of said other device to move to the position to exhaust air, and causing the operating means of the said one pair to reciprocate them to the position to open the exhaust port.

2. A valve apparatus as described in claim 1 and in which the operating means for the valves of the one device is normally actuated by source pressure to maintain the flow port open; and the said response of the control to failure of the other valves to move to position to exhaust air, is effected by the pressure at said other valves communicated by conduit means to the control.

3. The apparatus described in claim 1 and in which the operating means of each device comprises a pair of pressure chambers with a movable wall therebetween operatively connected to the respective valves; and the movable walls are actuated to move by a differential of pressure in the two chambers; and the said flow port of one device is maintained open by source pressure in one chamber and an exhaust from the other chamber; and a control is provided comprising alternately movable means to alternately shift a preponderance of source pressure from one chamber to the other of the other device; and the control movable means alternately moves in response to alternate signals communicated thereto by an operable signal control; and the means to cause the control to respond to said failure of the valves of the other device comprises conduit means communicating supplied pressure from said other device to the exhausted chamber of the said one device.

4. A valve apparatus for controlling the supply of air pressure from a pressure source to an apparatus served thereby, and for exhausting the pressure from the served apparatus; comprising a first and second valve device each having two pressure chambers and a reciprocable wall therebetween and each having a pair of valves connected to the movable wall to reciprocate therewith, the valves of each pair when reciprocated in one direction opening a flow port and closing an exhaust port and vice versa when reciprocated in the other direction; the pairs of valves disposed with the flow ports in series in a walled passageway, between the source of air pressure and the served apparatus, the exhaust ports when open communicating with respective exhaust openings through a wall of the passageway whereby when both movable walls are reciprocated in one direction the flow-ports are open and the devices are in so-called on-condition, and air flows from the source through the flow-ports to the served apparatus, and whereby upon reciprocation of the movable wall of either device, respectively, in said other direction the device is in so called exhaust-condition and the served apparatus will exhaust back through the exhaust port of the respective device; means communicating a differential of pressure derived from the source to the chambers of the first device effective to normally continuously maintain it in on-condition; means for communicating source pressure to the chambers of the second device, and a control mechanism alternately actuable to change the predominance of effective pressure from one chamber to the other to reciprocate the movable wall and alternately operate the second device to on-condition and exhaust-condition; an alternately operable and restorable control effective to correspondingly alternately actuate the control mechanism, to thereby cause source pressure to be supplied to and exhausted from the served apparatus in normal operation; means responsive to restoring of the control and communicating to a chamber of the first device, the pressure persisting at the second device, upon failure of the second device to go to exhaust-condition; the communication of said pressure to the chamber of the first device effecting a differential of pressure in its two chambers which causes the first device to exhaust-condition and exhaust the served apapratus.

5. A valve device comprising valve means, a pair of pressure chambers and a movable wall therebetween, the wall connected to the valve means to move the valve means to alternate positions upon reciprocation of the movable wall; means communicating pressure from a source to one chamber; a duct inlet to the other chamber from the source; an exhaust outlet from the other chamber larger than the duct inlet; whereby source pressure in said one chamber will move the wall and valve means to one position; duct valve means operable by said movement of the movable wall to close the duct inlet, whereby the other chamber may fully exhaust through the exhaust outlet; a conduit extending between a source of pressure and a conduit inlet to the said other chamber larger than the exhaust outlet; means to control flow of pressure from the source through the conduit inlet and into the said other chamber at a greater rate than that at which it exhausts at the exhaust outlet; whereby upon controlled admission of pressure to the other chamber through the conduit inlet, the movable wall will first move in the other direction to cause the duct valve means to open and to cause pressure from the source to flow to the other chamber through the duct inlet, and whereby the combined pressure in the other chamber from the conduit inlet and duct inlet will move the movable wall and valve means to the other position, with quick positive movement.

6. A valve apparatus for controlling the supply of air pressure from a source to an apparatus to be served thereby, and for exhausting the pressure from the served apparatus, comprising a housing having an inlet adapted to be connected to the source of pressure and having an outlet spaced from the inlet adapted to be connected to the apparatus to be served and containing two pressure chambers with a reciprocably movable wall therebetween, one chamber normally continuously communicating with source pressure in the housing; a flow port and an exhaust port in the housing, and a pair of valves connected to the movable wall to open the flow port and close the exhaust port and vice versa upon reciprocations of the wall; an exhaust outlet from the housing with which the exhaust port communicates; the source pressure in said one chamber normally holding the movable wall reciprocated in the direction to close to the exhaust port and open the flow port and cause air from the source to flow through the open flow port and from the housing outlet to the apparatus, and upon reciprocation in the other direction, exhaust from the apparatus will occur back through the exhaust outlet and exhaust port; other means operable to exhaust supplied pressure from the served apparatus; an operable control to actuate the other exhaust means; means operating in response to operation of the control and upon failure of the other exhaust means to effect exhaust when actuated and effecting communication of supplied air pressure to the other of said chambers and reciprocation of the movable wall in the other direction thereby to cut off pressure supply through the flow-port and exhaust the supplied pressure by way of the exhaust port and exhaust outlet.

7. A valve apparatus for controlling the supply of air pressure from a pressure source to an apparatus served thereby, and for exhausting the pressure from the served apparatus; the valve apparatus comprising a housing having an inlet for connection to the pressure source and having an outlet spaced from the inlet for connection to the apparatus; a pair of valve devices in series in the housing between the inlet and outlet, each valve device comprising a pair of valves and a flow-port and an exhaust port for each pair, and the valves of each device being operable to open the flow-port and close the exhaust port and the device is then in so-called on-condition, and to close the flow port and open the exhaust port and the device is then in so-called exhaust-condition respectively; operating means for the devices; the exhaust ports communicating with exhaust outlets from the housing; the valve devices being both operable to on-condition in which condition pressure from the source flows to the served apparatus through the open flow-ports of both devices; and either device being operable respectively, to exhaust-condition in which condition pressure exhausts from the served apparatus through the respective open exhaust-port, one device being normally continuously operated to on-condition; an operable and restorable control to actuate the operating means of the other device to cause operations of the other device to on-condition when the control is operated, and then to exhaust-condition when the control is restored, repeatedly, to cause pressure to be supplied to and exhausted from the served aparatus, repeatedly; and means responsive to the restoring of the control and to the failure of the other device to be correspondingly operated to exhaust-condition thereby, to cause operation of the operating means of said one device to operate it to exhaust condition.

8. The valve apparatus described in claim 7 and in which the operating means for the devices are actuated by air pressure and the operating means of said one device is actuated to operate it to exhaust condition by the air pressure continuing to be supplied to the apparatus upon said failure of the other device to exhaust it.

9. A valve apparatus for controlling the supply of air pressure from a pressure source to an apparatus served thereby, and for exhausting the pressure from the served apparatus; the valve apparatus comprising a pair of valve devices each comprising a flow port and an exhaust port and each device having valve means operable to open the flow port and close the exhaust port to put the devices in on-condition, and restorable to close the flow port and open the exhaust port to put the devices in off-condition; the flow ports being in series in a walled passageway, between a passageway inlet adapted to be conduit-connected to the pressure source, and a passageway outlet adapted to be conduit-connected to the apparatus; whereby with both devices in on-condition, air under pressure will be supplied from the source through the passageway, and through the two open flows ports to the apparatus; each device having an exhaust outlet from the passageway through the exhaust port when it opens; whereby when either device is restored to off-condition, pressure supply to the apparatus is discontinued and pressure in the apparatus may exhaust back through the passageway outlet and through the corresponding exhaust port, and passageway exhaust outlet; operating means actuated by pressure derived from the source for each valve means; operable signaling means; the operating means for one valve means responding to signals communicated thereto, to repeatedly alternately operate and restore the one valve means; the operating means for the other valve means being actuated by source pressure to normally put it in on-condition; and responding to said signals to normally maintain it in on-condition during alternate operation and restoring of said one valve means; and means effective upon failure of the one valve means to respond to signal and restore to off-condition when signalled so to do, to cause the operating means of the other valve means to operate and restore it to off-condition, and exhaust the apparatus.

10. A valve apparatus as described in claim 9 and in which the restoring of the other valve means upon failure of the one valve means to restore is effected by the signal, to which the one valve device failed to respond, rendered effective by its failure.

11. A valve apparatus for controlling the supply of air from an air pressure source to an apparatus to be served, and the exhaust of the air pressure from the served apparatus; the valve apparatus comprising a walled passageway having spaced apart inlet and outlet openings one for conduit-connection to the source and the other for conduit-connection to the apparatus to be served; a first and a second main valve device in series in the passageway, each having a flow-port and an exhaust-port, and each having a pair of valves reciprocably movable in unison, to close one port and open the other, and vice versa; the flow-ports being in series in interior walls in the passageway, and the exhaust-ports constituting exhaust openings in a wall of the passageway; whereby, when the flow-ports are both open, air may flow in at the inlet opening, through both flow-ports and out at the outlet opening to the served apparatus and when either exhaust-port is open and the corresponding flow-port is closed, the flow of air to the served apparatus is cut off at the closed flow-port and air may flow back therefrom through the outlet opening and exhaust through the open exhaust-port; operating means for each pair valves to reciprocate them comprising a pair of air chambers, lower and upper in a position of use, and a movable wall between them to which the pair of valves is connected; the wall being movable by air pressure in the respective chambers; the pairs of valves being normally biased downwardly in the position of use, to closed flow-port positions; a control for the pairs of valves comprising a first and second auxiliary valve device each having movable valve means, normally spring-biased to a restored position and each having magnetic means to move the valve means to an operated position when the magnetic means is electrically energized; a signal circuit for energizing and deenergizing both magnetic means simultaneously; the auxiliary devices having valve ports for the movable valve means; the first main device having its lower chamber always subjected to source pressure in the passageway, and its upper chamber having an exhaust, therefrom, whereby air under pressure in the passageway moves the valves of the first main device upwardly to open flow-port position, and maintains them normally in that position; the second main device having its lower chamber always subjected to pressure in the passageway and its upper chamber also subjected to source pressure from the passageway through a port of the second auxiliary valve device when the magnetic means are deenergized, whereby the second main device is normally maintained in closed flow-port condition; and the movable valve means of the second auxiliary device, when its magnetic means is energized in operation, opening a port that exhausts the upper chamber of the second main device and thereby causes the valves thereof to be moved by the wall to open flow-port position; conduit means communicating source pressure, from a point on the outlet side of the flow-port of the second main device when the flow-port thereof is open, to the upper chamber of the first main device, through an open port of the first auxiliary valve device when it is restored but said conduit communicated pressure being cut off at said port of the first auxiliary valve device when the latter is, in operation, operated by energization of its magnetic means, whereby in normal operation, upon successively energizing and deenergizing both magnetic means simultaneously, the valves of the first main device remain in open flow-port condition and the valves of the second main device successively move to open flow-port condition and closed flow-port condition and repeatedly supply air pressure to and exhaust it from the served apparatus; and whereby upon failure of the second main device to go to closed flow-port condition upon deenergization of the magnetic means, and restoring of the auxiliary valve devices, pressure in said conduit means is communicated to the upper chamber of the first main device and preponderates over the exhaust therefrom and causes its movable wall to move the valves of the first main device to closed flow-port and opened exhaust-port condition respectively, to exhaust the pressure from the served apparatus through the open flow-port of the second main device and through the open exhaust port of the first main device.

12. A valve apparatus as described in claim 11, and in which upon restoring of both auxiliary valve devices and the valves of the second valve device move downwardly but are stopped by any cause from fully closing the flow-port, means is provided to direct air under pressure flowing from the passageway through the partly open flow-port into the said conduit and thence through the open port of the restored first auxiliary valve device and into the upper chamber of the first main valve device to cause the valves of the latter to move downwardly and cut off the flow of air at the flow-port and open the exhaust-port.

13. A valve apparatus as described in claim 11 and in which upon energizing both magnetic means to operate both auxiliary valve devices and the second auxiliary device operates and the valves of the second main device move to open flow-port condition but the first auxiliary device fails to operate and cut off flow in the conduit means, flow in said conduit means enters the upper chamber of the first main device and causes it to close its flow-port and open its exhaust-port.

14. An apparatus as described in claim 11 and in which upon deenergizing both magnetic means to restore both auxiliary valve devices, and the second auxiliary device restores and the valves of the second main valve go to closed flow-port and open exhaust-port condition, and the served apparatus exhausts, but the first auxiliary valve device may fail to restore, and the pressure communicated to the said conduit means at the second main device as aforesaid accordingly falls to atmospheric pressure or less due to exhausting of the served apparatus; and in which a third auxiliary valve device pneumatically controlled is provided comprising two chambers, upper and lower in a position of use, and a movable wall between them connected to a valve having a normally closed valve port; and the said conduit means communicates directly with the lower chamber and also communicates with the upper chamber through a check valve; and during normal operation when the second main valve device is in open flow-port condition, the said conduit means communicates its said source pressure to both the upper and lower chambers; and in which when the first auxiliary valve device fails to restore as aforesaid, this pressure in the upper chamber is trapped therein by the still operated first auxiliary valve device and by the said check valve; and the lower atmospheric pressure in the conduit means, being communicated directly to the lower chamber of the third device causes the movable wall to move downwardly and move the valve connected thereto, to open the valve port of the third device and in which, conduit means is provided communicating between the source pressure in the lower chamber of the first main device and one side of the said valve port of the third device, and the aforesaid exhaust frame the upper chamber of the first main device communicates by conduit means with the other side of the port of the third device, whereby upon opening of the port of the third device the upper and lower chambers of the first main device communicate with each other through the said opened port, and are both subjected to source pressure and the valves of the first main device accordingly move down to close its flow-port.

References Cited in the file of this patent

UNITED STATES PATENTS

| | | |
|---|---|---|
| 2,636,581 | Bitter | Apr. 28, 1953 |
| 2,711,158 | Leduc | June 21, 1955 |

FOREIGN PATENTS

| | | |
|---|---|---|
| 655,892 | France | 1928 |